Sept. 19, 1967  R. G. PARKISON  3,342,448
SELF-CLOSING FAUCET
Filed Sept. 16, 1964
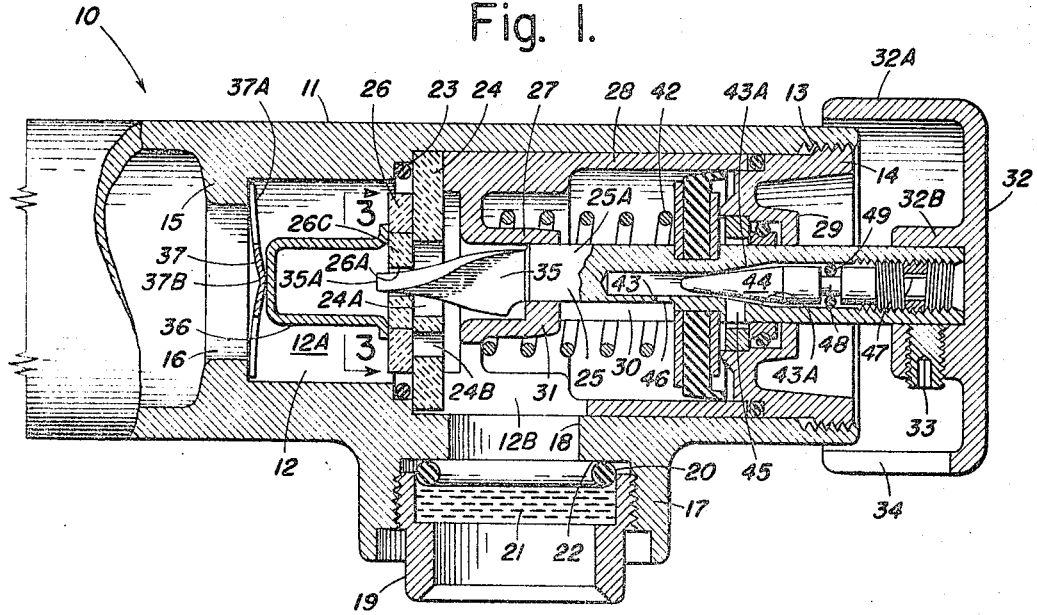
Fig. 1.
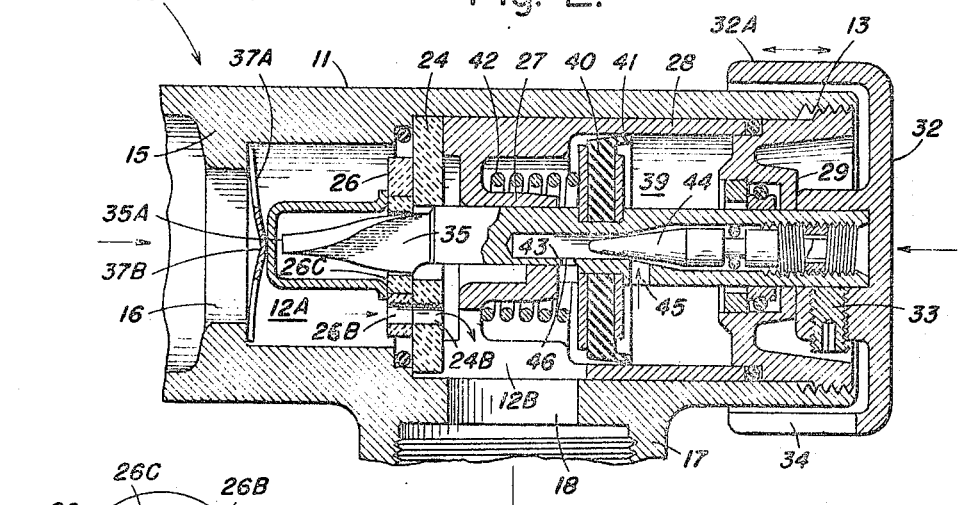
Fig. 2.
Fig. 3.
INVENTOR
Richard G. Parkison
BY Frank J. Gordon
ATTORNEY

3,342,448
SELF-CLOSING FAUCET
Richard G. Parkison, Louisville, Ky., assignor to American Standard Inc., a corporation of Delaware
Filed Sept. 16, 1964, Ser. No. 396,843
6 Claims. (Cl. 251—51)

This invention relates to a self-closing faucet and more specifically to an improved faucet of the type which will automatically shut off after the lapse of a predetermined interval of time.

An object of this invention is to provide an automatic shut off faucet having an improved valve and valve seat structure to provide for trouble free operation over an extended period of time.

Another object is to provide an automatic shut off faucet having a positive acting rotary valve means which is rendered operative upon the application of an axial force to an associated valve stem.

Still another object is to provide an automatic shut off faucet in which the internal construction thereof is relatively simple, can be readily manufactured and assembled, and which is positive in operation.

The foregoing objects and other features and advantages are attained by an automatic, self-closing faucet that comprises a body defining a fluid passageway having an inlet and outlet for conducting a flow of fluid therethrough. A valving means is interposed in the passageway between the inlet and the outlet for controlling the flow of fluid therethrough. The valving means comprises a stationary seat having one or more fluid openings therein cooperatively associated with a movable valve member which is mounted for relative rotation with respect to the stationary seat. The rotary valve member has formed therein one or more fluid openings adapted to be rotated into and out of alignment with a like number of openings formed in the stationary seat for bringing the inlet into and out of communication with the outlet thereof. A reciprocating actuating means or valve stem is operatively connected to the rotating valve member whereby a cooperating cam means in the form of a spiral or helical cam carried on the valve stem is adapted to be received in an associated cam slot formed in the rotary valving member. The arrangement is such that the reciprocal movement imparted to the valve stem is translated into a rotational movement of the valve member whereby the openings therein are brought into and out of alignment with the fluid openings of the associated stationary valve seat.

Means in the form of a spring is provided for normally maintaining the actuating means or valve stem and associated valve member in the closed position of the faucet.

A dash pot assembly is located within the body of the faucet and it is filled with fluid whenever the faucet is actuated to the open position. A piston means carried by the valve stem is disposed in sealing relationship with the internal surface of the dash pot assembly in a manner to permit a portion of the fluid in the passageway to be bypassed thereby during the opening movement of the actuator or valve stem and which prohibits the flow of fluid thereby on the closing movement of the actuating means or valve stem. Means are provided for exhausting the fluid in the dash pot during the closing movement of the valve actuating means and for adjusting the rate at which the fluid is exhausted to control the closing rate or operating time interval of the valve.

It is therefore a feature of this invention to provide an automatic self-closing faucet having an improved rotating valve means which is operatively associated with a stationary seat whereby an axial force applied on a connected actuating member imparts a rotational movement to the valve member to effect a positive opening and closing of the fluid openings connecting the inlet to the outlet.

Other features and advantages will become more readily apparent when considered in view of the drawings in which, FIGURE 1 is a cross-sectional view of an automatic, self-closing faucet embodying the invention wherein the component parts of the faucet are shown in an inoperative or "off" position.

FIGURE 2 is a view similar to FIGURE 1 in which the respective components of the faucet are shown in the operative or "on" position.

FIGURE 3 is a section view taken along line 3—3 of FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed is for the purpose of description and not of limitation.

Referring to the drawings, the automatic self-closing faucet 10 of the instant invention comprises a tubular body 11 which defines a fluid passageway 12 for the flow of fluid therethrough. One end of the tubular body may be internally threaded at 13 for receiving a gland 14 which forms a closure for the end of the tubular body 11. The opposite end of the tubular body is provided with an inturned flange 15 to define a fluid inlet 16 for the passageway 12. Intermediate the length of the body 11 there is formed a spout 17 forming an outlet 18 for the fluid passageway 12. The spout 17 may be internally threaded to receive an aerator 19 or the like. A suitable gasket 20 may be interposed between the screens 21 of the aerator 19 and an internal shoulder 22 to form a fluid tight seal therebetween.

In accordance with this invention, the body 11 may be formed with an internal shoulder 23 to receive a stationary valve seat 24. The valve seat 24 comprises a disc or plate formed with a central opening 24A through which an actuating means 25 extends and at least one or more fluid openings 24B spaced about the central opening 24A.

Cooperatively associated with the valve seat 24 is a rotary means for valving the fluid opening 24B of the valve seat to control the flow of the fluid from the inlet to the outlet of the passageway 12. As best seen in FIGS. 1 and 2, the rotary means comprises a valve member 26 arranged to rotate relative to the stationary valve seat 24. In the illustrated embodiment the valving member 26 comprises a disc shaped member which is provided with a central elongated or slotted opening 26A adapted to receive one end of the actuating means 25, to be hereinafter described, and at least one or more openings 26B, corresponding in number to the openings 24B in the stationary seat, which are adapted to be rotated into and out of alignment with the openings 24B of the stationary seat. The arrangement is such that the fluid openings 26B of the valve member 26 are normally disposed out of alignment with the openings 24B of the stationary seat 24 so that the inlet portion 12A of the fluid passageway is positively sealed from the outlet portion 12B in the inoperative position of the faucet 10. The openings 24B or 26B may be elongated so as to give a full flow for a designated period before starting to shut-off.

The actuating means 25 for the rotary valve member 26 may be in the form of a valve stem 25A reciprocally mounted within the passageway 12 of the faucet in suitable bearing means. The inboard bearing means 27 is defined by an annular boss which is formed integral with a housing member 28 fitted within the body 10 of the faucet and which defines the wall portions of a dash pot assembly, as will be hereinafter described. The outboard bearing 29 of the valve stem 25 is defined by the hub of the end gland 14.

To prevent rotation of the actuating member or stem 25, the latter is provided with a longitudinal extending slot or keyway 30 for receiving a complementary key 31 formed integral on the inboard bearing member 27. Consequently, the valve stem 25A may be reciprocated in and out of the housing without being rotated.

One end of the valve stem 25 extends outwardly through the gland 14 and has suitably connected thereto an operating knob or handle 32 by which the valve stem is actuated. The knob 32 may have a turned flange 32A that extends beyond and circumscribes the circumference of the tubular body 11. Consequently, in operation, it will become apparent that upon an axial displacement of the valve stem 25 inwardly of the faucet, the end portion of the body 11 is received within the flange construction 32A of the operating knob 32. A suitable set screw 33 secures the knob 32 in place on the valve stem 25. Accordingly, an appropriate opening 34 is formed in the flange 32A of the knob 32 which will permit access of the necessary tool for screwing or unscrewing the set screw 33 as may be required for repair, replacement, or adjustment of the cooperating parts.

The inner end of the valve stem 25 has connected thereto a cam means in the form of a spiral or helically shaped cam 35. As shown the leading end 35A of the cam extends through the center opening 24A of the stationary seat 24 and into the slotted opening 26A of the rotating valve member 26. The arrangement is such that the axial translation of the valve stem 25 is translated into a rotary movement of the valve member 26. The rotating valve member 26 may have a plastic insert 26C secured in a central portion thereof to avoid wear between the cam 35 and the slotted opening 26A in the plastic insert 26C.

A cup shaped member 36 is secured to the inlet side of the rotating valve member 26 to define a fluid tight seal about the slotted opening 26A. To maintain rotating valve member 26 into contiguous relationship with respect to the stationary valve seat 24, a spider spring 37 is provided. The legs 37A of the spider spring 37 rest against the inturned shoulder or flange 15 which defines the inlet opening 16 with the hub or the central portion 37B of the spider spring bearing against the bottom of the cup seal 36.

By way of example, the rotating valve member 26 and the cooperating stationary valve seat 24 may be formed of a ceramic material having a mirror like finish. Accordingly, the ceramic construction of the valving member 26 and its associated valve seat 24 minimizes the corrosive and erosive effects normally encountered in faucet constructions. Further, the mirror like finish of the respective ceramic valving member and associated valve seat provides a low coefficient of friction.

Means are provided within the body of the faucet to effect an automatic shut off of the flow of fluid therethrough after the lapse of a predetermined interval of time upon the actuation or opening of the faucet. The automatic shut-off means comprises the housing 28 which defines the wall portion of a dash dot chamber 39 and a piston 40 which is connected to the valve stem 25. The piston 40 is provided with a flexible peripheral flange 41 constructed such that fluid is permitted to be by-passed therearound to fill the chamber portion 39 of the dashpot when the stem 25 is moved inwardly of the valve body 11 or towards the open position of the faucet. The inward displacement of valve stem 25 in turn causes the helical cam 35 to project further into the slotted opening 26A of the valve member 26, thus causing the valve member 26 to rotate to bring the openings 26B thereof into alignment with the openings 24B of the stationary valve seat 24. When this occurs the faucet 10 is open and the fluid flows from the inlet portion of the valve housing to the outlet.

Upon the release of the force effecting axial displacement of the valve stem 25, a spring 42 interposed between the base of the housing member 28 and the piston 40 will tend to return the piston 40 and stem 25 toward its normal inoperative or outer position to close the faucet. However, the force of the spring 42 is resisted by the fluid in the chamber portion 39 of the dash pot. Means are provided for throttling or slowly exhausting the fluid from the dash pot assembly to provide an operating time interval for the valve.

In accordance with this invention, the means for throttling the fluid from the dash pot assembly comprises a bore 43 that extends longitudinally of the valve stem 25 and to either side of the piston 40 secured thereto. A section of the bore 43 is formed with a tapering or restricted portion 43A cooperatively associated with a needle valve 44. Disposed on opposite sides of the piston 40 is a lateral inlet port 45 and an outlet port 46. As best seen in FIG. 2, the connected valve stem 25 and piston 40 in moving toward their closed position under the action of the spring 42 acting thereon, causes the fluid within the dash pot chamber 39 to be slowly exhausted therefrom by entering the bore 43 of the stem through port 45 and exiting therefrom through port 46 from whence the fluid is discharged through the faucet outlet 18. Accordingly, the rate at which the fluid in the dash pot assembly is exhausted through the bore 43 and ports 45, 46 determines the time interval of the faucet operation.

Means are provided for effectively regulating the rate at which the fluid in the dash pot assembly is exhausted. In accordance with this invention, this means comprises the adjustable needle valve 44 disposed within the bore of the stem. One end of the bore is threaded for receiving adjusting screw 47 which is connected to the needle valve by a reduced neck portion 48 and about which an O ring 49 is disposed to form a seal. Thus, depending on the direction in which the adjusting screw 47 is turned, the needle valve 44 is moved inwardly or outwardly of the restriction 43A to thereby control the size of the restricted opening through which the fluid of the dash pot assembly is throttled.

In order to effect the adjustment of the needle valve 44, the operating knob 32 must be removed to expose the opened end of the bore in the valve stem 25. By the access thus provided the needle valve 44 may be adjusted to the desired setting.

The operation of the faucet is as follows:

As shown in FIG. 1, the faucet 10 is disposed in its normally inoperative or shut-off position. To effect the operation of the faucet, an axial force is imparted on the end of the operating knob 32 to displace the connected valve stem 25 with spiral cam 35 inwardly of the valve housing. Inward axial displacement of the spiral cam 35 effects a rotation of the valve member 26 relative to the stationary seat 24 thereby bringing the opening 26B of the valve member 26 into alignment with the openings 24B of the valve seat 24. With the openings of the respective valving means disposed in alignment, the fluid is free to flow from the inlet portion of the faucet to the outlet portion of the body. Upon the aforesaid inward displacement of the piston 40, a portion of the fluid by-passes around the peripheral flange 41 of the piston and thereby fills the chamber 39 of the dash pot assembly. Upon release of the axial pressure on operating knob 32, the spring 42 will tend to return the valve stem 25 and associated valve member 26 to its normal inoperative position. However, because of the fluid within the dash pot chamber 39, the force of the spring 42 acting thereon is resisted. The spring 42 overcomes the resistance of the fluid in the dash pot assembly by causing the fluid therein to be exhausted through the bore 43 and associated ports 45, 46 with the fluid ultimately being discharged through the outlet opening 18 of the faucet.

While the instant invention has been described with reference to a particular embodiment thereof, it will be readily understood that variations and modifications thereof may be made without departing from the spirit or scope of the instant invention.

What is claimed is:

1. A self-closing faucet comprising, a tubular body defining a fluid passageway having an inlet and outlet, a valving means interposed in said passageway between said inlet and said outlet, said valving means comprising a stationary valve seat having a fluid opening therein, and a movable valve member mounted for rotation relative to said stationary seat, said movable valve member having a fluid opening therein adapted to be rotated into and out of alignment with the opening of said stationary seat for communicating said inlet in and out of fluid flow relationship with said outlet, a reciprocating valve stem mounted in said passageway, and cam means connecting said valve stem to said movable valve member whereby reciprocable displacement of said stem effects rotary movement of said movable valve member for placing the openings in the latter and in the valve seat into and out of alignment with one another and means for biasing said movable valve member against said stationary valve seat, said biasing means including a spring and a co-operating cup interposed between said spring and said movable valve member.

2. A self-closing faucet comprising, a tubular body defining a fluid passageway, means defining a fluid inlet and a fluid outlet for said passageway, a stationary valve seat interposed in said passageway between said inlet and said outlet, said seat having a fluid opening therein for connecting said inlet to said outlet, a rotary valve member disposed against said valve seat in contiguous relationship therewith, said valve member having a fluid opening adapted to be rotated into and out of alignment with the opening in said valve seat for connecting said inlet into and out of communication with said outlet, a valve stem extending into said housing, means connecting said valve stem to said valve member, said latter means including a spiral cam connected to the end of said stem, said valve member having a cam opening adapted to receive said spiral cam whereby axial displacement of said cam upon reciprocation of said connected stem effects rotary movement of said valve member, means for sealing the cam opening of said valve member, means disposed in said housing for retarding the closing of said valve member, the last said means comprising a piston having a flexible peripheral flange disposed in sealing relationship with the internal wall of said passageway to define a dash pot chamber whereby axial displacement of said stem and connected piston toward operative position causes a portion of the fluid to flow around said piston flange and into said chamber, means for exhausting the fluid from said chamber for retarding the return of said stem and associated valve member toward its inoperative position, and a spring means disposed about said stem for biasing said stem and piston head toward said inoperative position.

3. A self-closing faucet comprising, a tubular body defining a fluid passageway, a gland sealing one end of said body, means defining a fluid inlet and a fluid outlet to said passageway, a stationary valve seat interposed in said passageway between said inlet and said outlet, said seat having a fluid opening therein for connecting said inlet to said outlet, a rotary valve member in contacting relationship with said valve seat, said valve member having a fluid opening adapted to be rotated into and out of alignment with the opening in said valve seat for connecting said inlet into and out of communication with said outlet, a dash pot housing interposed in said body, a valve stem extending axially of said housing, bearing means formed in said housing and gland for supporting said stem for reciprocal movement within said body, means connecting said valve stem to said valve member, the last said latter means including a spiral cam connected to the end of said stem, said valve member having a cam opening adapted to receive said cam whereby axial displacement of said spiral cam upon reciprocation of said connected stem effects rotary movement of said valve member, means for sealing the cam opening of said valve member, said latter means including a cup seal secured to said valve member and receiving said cam, spring means for biasing said cup seal and connected valve member against said stationary seat, means for retarding the closing of said valve member and associated stem, the last said means including a piston having a flexible peripheral flange disposed in sealing relationship with the internal wall of said housing to define with said gland a dash pot chamber, means communicating said housing with said fluid passageway whereby axial displacement of said stem inwardly causes a portion of the fluid to flow around said flange of said piston and into said dash pot chamber, means for exhausting the fluid from said chamber to said outlet for retarding the return of said stem and associated valve member to a closed position, said means including an axial bore in the stem, said bore having an inlet thereto disposed on the chamber side of said piston and an outlet disposed on the other side of said piston through which the fluid in said chamber is exhausted, a spring means disposed about said stem for biasing said stem and piston toward said gland, and means for regulating the discharge of fluid from said chamber to said outlet to adjust the closing rate of said valve member.

4. A self-closing faucet comprising, a tubular body defining a fluid passageway having an inlet and outlet, a valving means interposed in said passageway between said inlet and said outlet, said valving means comprising a stationary valve seat having a fluid opening therein, and a movable valve member mounted for rotation relative to said stationary seat, said movable valve member having a fluid opening therein adapted to be rotated into and out of alignment with the opening of said stationary seat for communicating said inlet in and out of fluid flow relationship with said outlet, a reciprocating valve stem mounted in said passageway, cam means connecting said valve stem to said movable valve member whereby reciprocable displacement of said stem effects rotary movement of said movable valve member for placing the openings in the latter and in the valve seat into and out of alignment with one another, and closure retarding means disposed in said housing for retarding the closing of said valve member, said retarding means comprising a piston having a flexible peripheral flange disposed in sealing relationship with the internal wall of said passageway to define a dash pot chamber whereby axial displacement of said stem and connected piston toward operative position causes a portion of the fluid to flow around said piston flange and into said chamber, means for exhausing the fluid from said chamber, for retarding the return of said stem and associated valve member toward its inoperative position, and a spring means disposed about said stem for biasing said stem and piston head toward said inoperative position.

5. A self-closing faucet comprising:
 (1) a tubular body defining a fluid passageway;
 (2) fluid inlet means to said passageway;
 (3) fluid outlet means from said passageway;
 (4) valve means interposed in said passageway between said inlet and said outlet means, said valve means including a stationary member and a movable member;
 (5) dash pot housing interposed in said body;
 (6) valve stem means extending axially of said housing and operatively connected to said movable member, for moving said movable member relative to said stationary member and thereby selectively opening and closing said valve;
 (7) piston means on said stem and in peripheral engagement with said housing, and forming one wall of said dash pot housing, said fluid outlet means being located between said valve means and piston means;

(8) means communicating said housing with said fluid passageway whereby axial displacement of said stem inwardly causes fluid to flow into said dash pot housing;

(9) spring means biasing said stem and piston for movement so as to discharge fluid from said dash pot housing;

(10) egress means downstream of said valve means, communicating said dash pot housing with said fluid outlet; and

(11) means for variably controlling the rate of fluid flow through said egress means; said piston means including a flexible peripheral flange disposed in sealing relationship with the internal wall of said dash pot housing, said flexible flange permitting fluid flow into said dash pot and precluding fluid flow out of said dash pot and said means for variably controlling fluid flow includes an axial bore in said stem, said bore having an inlet thereto disposed on the housing side of said piston and an outlet disposed on the other side of said piston through which fluid in said chamber is exhausted, said movable member being a rotary member and having a fluid opening adapted to be rotated into and out of alignment with an opening in said stationary member and cam means connecting said stem to said rotary member whereby axial displacement of said stem effects rotary movement of said valve member.

6. The self-closing faucet of claim 5, wherein said rotary member and said stationary member are formed of a ceramic material.

References Cited
UNITED STATES PATENTS

| | | | |
|---|---|---|---|
| 2,188,158 | 1/1940 | Rock | 74—57 |
| 2,202,971 | 6/1940 | Vedoe | 251—50 X |
| 2,595,671 | 5/1952 | Greene | 251—368 |
| 2,710,164 | 6/1955 | Hare | 251—278 |
| 3,057,300 | 10/1962 | Ulbing | 251—58 |
| 3,065,948 | 11/1962 | Nolan | 251—52 |

M. CARY NELSON, *Primary Examiner.*

A. ROSENTHAL, *Assistant Examiner.*